US010430617B2

(12) United States Patent
Katayama et al.

(10) Patent No.: US 10,430,617 B2
(45) Date of Patent: Oct. 1, 2019

(54) TERMINAL DETERMINATION DEVICE AND METHOD

(71) Applicant: FUJITSU LIMITED, Kawasaki-shi, Kanagawa (JP)

(72) Inventors: Yoshinori Katayama, Kawasaki (JP); Hiroshi Tsuda, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 14/979,155

(22) Filed: Dec. 22, 2015

(65) Prior Publication Data
US 2016/0212124 A1 Jul. 21, 2016

(30) Foreign Application Priority Data
Jan. 15, 2015 (JP) .................. 2015-006059

(51) Int. Cl.
H04L 29/06 (2006.01)
G06F 21/84 (2013.01)
G06F 21/44 (2013.01)

(52) U.S. Cl.
CPC ............ *G06F 21/84* (2013.01); *G06F 21/445* (2013.01); *H04L 63/0428* (2013.01)

(58) Field of Classification Search
CPC ..... G06F 21/84; G06F 21/445; H04L 63/0428
See application file for complete search history.

(56) References Cited

U.S. PATENT DOCUMENTS

| 7,448,087 | B2 * | 11/2008 | Ohmori | G06Q 20/341 |
| | | | | 713/189 |
| 2006/0212703 | A1 | 9/2006 | Kojima | |
| 2007/0174472 | A1 * | 7/2007 | Kulakowski | G06F 21/31 |
| | | | | 709/229 |
| 2008/0010679 | A1 * | 1/2008 | Kim | G06F 21/80 |
| | | | | 726/19 |
| 2011/0239286 | A1 * | 9/2011 | Hiraide | H04L 63/0861 |
| | | | | 726/7 |
| 2012/0317622 | A1 * | 12/2012 | Harjanto | G06F 21/44 |
| | | | | 726/4 |
| 2013/0067582 | A1 * | 3/2013 | Donovan | H04L 63/08 |
| | | | | 726/25 |

(Continued)

FOREIGN PATENT DOCUMENTS

| JP | 07-134696 | 5/1997 |
| JP | 2000-172296 | 6/2000 |
| JP | 2004-179865 | 6/2004 |

(Continued)

OTHER PUBLICATIONS

Great Britain Search Report dated Jun. 14, 2016 for Great Britain Patent Application No. GB1523072.5, 3 pages.

(Continued)

Primary Examiner — Khoi V Le
(74) Attorney, Agent, or Firm — Fujitsu Patent Center

(57) ABSTRACT

A terminal determination device includes a processor that executes a procedure. The procedure includes acquiring operation information indicating history of operation that has taken place on a terminal, and, according to whether or not the acquired operation information belongs in a particular range of similarity with operation information stored associated with a specific terminal, determining whether or not the terminal is the specific terminal.

12 Claims, 8 Drawing Sheets

(56) References Cited

U.S. PATENT DOCUMENTS

2014/0032346 A1*  1/2014  Hong .................... G06Q 20/20
                                                          705/18

FOREIGN PATENT DOCUMENTS

| JP | 2006-260490 A | 9/2006 |
|----|---------------|--------|
| JP | 2008-27286 A | 2/2008 |
| JP | 2009-175984 | 8/2009 |
| JP | 2010-114725 A | 5/2010 |
| JP | 2012-78922 A | 4/2012 |
| JP | 2012-150530 A | 8/2012 |
| JP | 2014-96172 A | 5/2014 |
| WO | 2014/097785 A1 | 6/2014 |

OTHER PUBLICATIONS

Japanese Office Action dated Apr. 17, 2018 for corresponding Japanese Patent Application No. 2015-006059, with English Translation, 6 pages.

Japanese Office Action dated Nov. 13, 2018 for corresponding Japanese Patent Application No. 2015-006059, with English Translation, 10 pages. *Please note JP-2009-175984-A, JP-2012-150530-A and JP-2014-96172-A cited herewith, were previously cited in an IDS filed on Dec. 22, 2015 and May 30, 2018.*

* cited by examiner

| TERMINAL ID | USER ID | OPERATION TRAIT INFORMATION |
|---|---|---|
| AAA | aaa@aaa | (3, 0.3, 1-2, 0.5) |
| BBB | aaa@aaa | (1, 0.5, 3-1-(1), 0.5) |
| CCC | ccc@ccc | (6, 0.5, 1-1, 0.3) |
| ... | ... | ... |

TERMINAL DETERMINATION DEVICE AND METHOD

CROSS-REFERENCE TO RELATED APPLICATION

This application is based upon and claims the benefit of priority of the prior Japanese Patent Application No. 2015-006059, filed on Jan. 15, 2015, the entire contents of which are incorporated herein by reference.

FIELD

The embodiments discussed herein are related to a terminal determination device, a terminal determination method, and a recording medium storing a terminal determination program.

BACKGROUND

In recent years, information theft and the like by targeted email attacks has been increasing as cases of cyber-attack. As an example of technology related to countermeasures against targeted email attacks, there is technology that detects spoofed email from an unauthorized terminal by appending identification information (for example, a MAC address) of the terminal that is the transmission source of an email in the email header when transmitting and receiving email.

Technology also exists that, based on the receiving history at the receiving side, detects spoofed email sent by the attacking side using an unauthorized personal computer (PC) or network.

However, such technology references identification information of the transmission source terminal against permitted identification information, and is not able to detect spoofed email that forges the transmission source information.

There has therefore been a proposal to attach biometric traits acquired from a terminal user to email before transmission, and to determine whether or not email is from an authorized terminal that the user is permitted to use. For example, technology has been proposed in which voice trait patterns in a password spoken by the sender are appended to electronic mail, and the appended voice trait patterns are compared to reference-use voice trait patterns of the sender themselves that were received in advance at the side of the receiver of the electronic mail. In such technology, the terminal that is the transmission source of the electronic mail is determined whether terminal that the sender is permitted to use.

Related Patent Documents

Japanese Laid-Open Patent Publication No. 2009-175984
Japanese Laid-Open Patent Publication No. 2000-172296

SUMMARY

According to an aspect of the embodiments, a terminal determination device includes a processor configured to execute a procedure. The procedure includes acquiring operation information indicating history of operation that has taken place on a terminal, and, according to whether or not the acquired operation information belongs in a particular range of similarity with operation information stored associated with a specific terminal, determining whether or not the terminal is the specific terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding examples of exemplary embodiments according to technology disclosed herein, with reference to the drawings.

First Exemplary Embodiment

In a first exemplary embodiment, explanation is given regarding a terminal determination system at the email receiving side that, when transmitting and receiving email using a mailer installed to the terminal, determines whether or not a terminal at the email transmitting side is a specific terminal.

Figure 1:
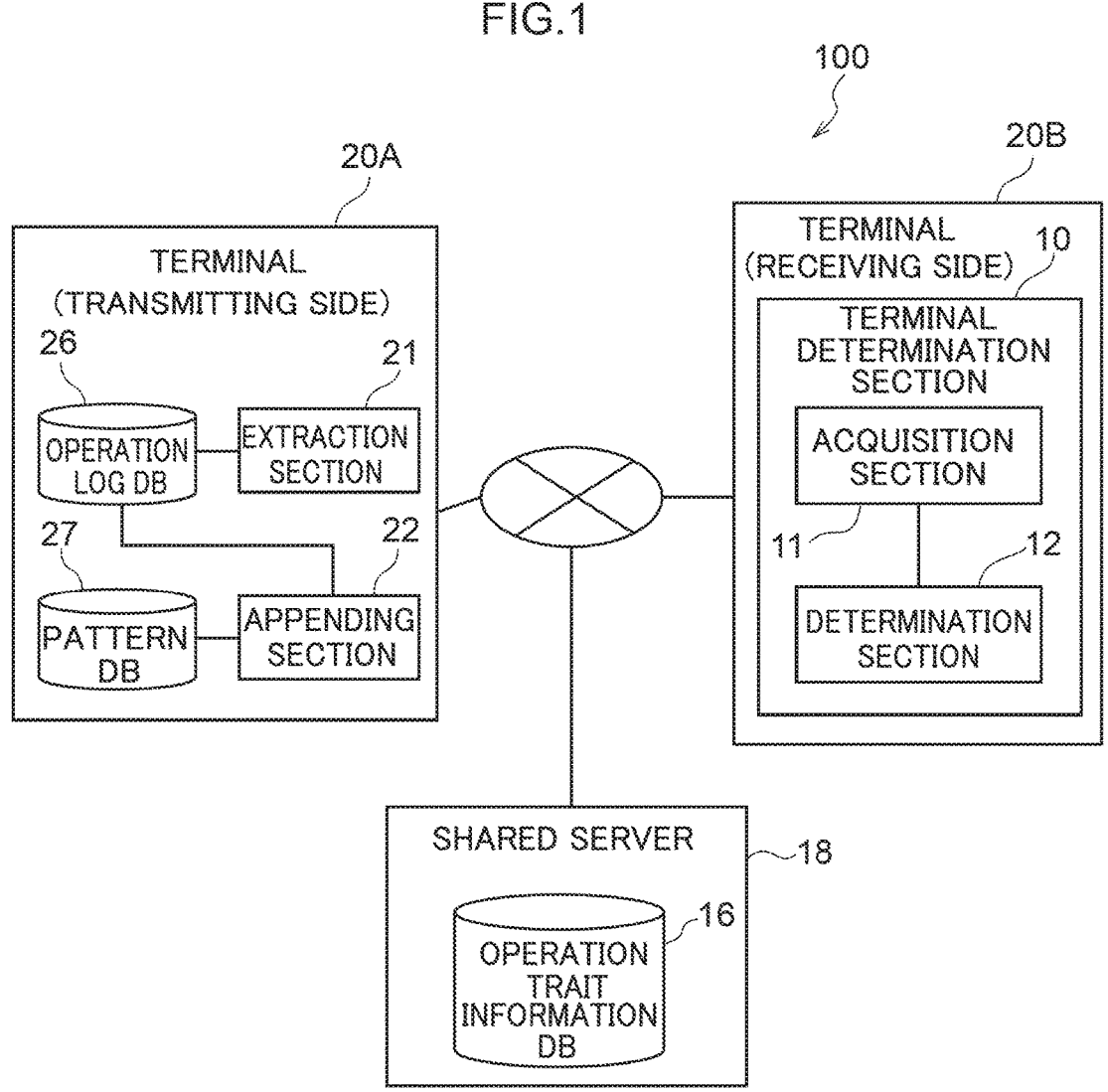
FIG. 1 is a functional block diagram illustrating a schematic configuration of a terminal determination system according to a first exemplary embodiment.

As illustrated in FIG. 1, a terminal determination system 100 according to the first exemplary embodiment includes plural terminals 20 mutually connected through a network. In the first exemplary embodiment, a terminal 20A at an email transmitting side and a terminal 20B at an email receiving side are distinguished from each other for ease of explanation. Note that when the terminal 20A on the receiving side and the terminal 20B on the email transmitting side are not distinguished from each other in the explanation, they are simply denoted "terminal 20". Moreover, although a single terminal 20A and a single terminal 20B are depicted in FIG. 1, plural terminals 20A and plural terminals 20B may be included.

The terminal determination system 100 also includes a shared server 18 storing an operation trait information database (DB) 16, described below.

The terminal 20 is, for example, a device such as a personal computer (PC), a smartphone, or a tablet. The terminal 20 includes input devices such as a keyboard, mouse, and touch panel display, and receives various operations from users through the input devices. Plural applications such as a mailer, a word processing application, and a spreadsheet application run on the terminal 20. The terminal 20 enters a screen lock state when no operations are performed on the terminal 20 for a specific time or greater. When an operation is performed on the terminal 20 while in the screen lock state, the terminal 20 is restored to the state prior to entering the screen lock state.

The terminal 20A includes an extraction section 21 and an appending section 22 as functional sections related to the terminal determination system 100.

During a user operation performed on the terminal 20A, the extraction section 21 extracts target operations, and records information regarding the extracted operation in an operation log DB 26 serving as an operation log. For target operations, operations that readily show the traits of each user when the operation is performed with a user present may be predetermined as the target operations. Here, the target operations are a switching operation and a restoration operation. The switching operation is an operation that switches the active application, and the restoration operation is an operation performed when restoring from screen lock. Note that the target operations are not limited to the switching operation and the restoration operation. Startup and closing of applications, or a combination of operations of switching, startup, and closing of applications, and restoration from screen lock, may serve as the target operations. Various operation methods, such as pressing a shortcut key or operating the mouse, exist for the operations of switching of applications and restoring from screen lock, and traits of the individual user show readily with regard to which of these operation methods is selected. Accordingly, the target operation may be set without being limited to the above examples, as long as there are plural options for the operation method of operation employed.

More specifically, the extraction section 21 monitors user operations performed on the terminal 20A, and when application switching is performed, extracts the previously performed user operation as the switching operation. Moreover, the extraction section 21 extracts the first user operation performed after the terminal 20A enters the screen lock state as the restoration operation. Information indicating a pressed key, information indicating a mouse click that selected an icon or the like, information indicating that the mouse was moved, or the like, may be extracted as the user operation. For information indicating that the mouse was moved, information indicating the direction in which the mouse was moved (the movement path of the mouse), and the amount of movement, is extracted. The extraction section 21 also extracts both the start timing and the end timing of the target operation. For example, the timing at which the key was pressed down or the time at which mouse movement started at the start of the target operation may be extracted as the start timing, and the timing at which the key was released or the timing at which mouse movement stopped at the end of the target operation may be extracted as the end timing. As described above, in addition to which operation method was selected, the time taken for the operation is another factor that causes traits of the individual user to show readily.

Figure 2:
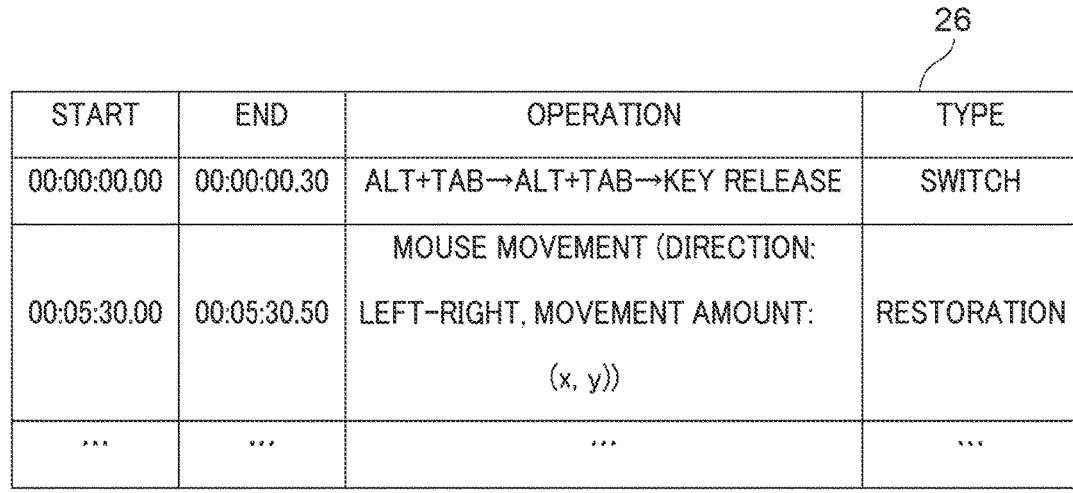
FIG. 2 is a diagram illustrating an example of an operation log database (DB)

The extraction section 21 stores the extracted switching operation and the restoration operation respectively as a singular operation logs in the operation log DB 26. FIG. 2 illustrates an example of the operation log DB 26. In the operation log DB 26 illustrated in FIG. 2, each row corresponds to a single operation log, and each operation log includes a "start", "end", "operation", and "type" item. "Start" and "end" are information indicating the start timing and end timing of the target operation indicated by the operation log, "operation" is information indicating the content of the information indicated by the operation log, and "type" is information indicating whether the operation indicated by the operation log is a switching operation or a restoration operation. In the example of FIG. 2, "switch" is set when the operation indicated by the operation log is a switching operation, and "restoration" is set when the operation indicated by the operation log is a restoration operation.

When an email is transmitted from the terminal 20A by the mailer, the appending section 22 references the operation log DB 26, generates operation trait information, and appends the operation trait information to the email.

More specifically, the appending section 22 references a pattern DB 27, and from the operation log DB 26 extracts each of the switching operations and restoration operations tabulated not long before the email transmission. For each switching operation and each restoration operation, plural patterns are transformed into IDs and defined in the pattern DB 27.

For example, the following respective patterns may be established as switching operations. Note that the numeral listed at the beginning of each pattern is the ID of the switching operation. Moreover, application is shortened to "app" below.

1: a listing of thumbnails of running apps is displayed using a shortcut key (ALT+TAB), then the app selection state is switched using a shortcut key (ALT+TAB), and the app selected when the ALT key released is switched to
2: a listing of thumbnails of running apps is displayed using a shortcut key (ALT+TAB), and then an app that has been selected from the listing by clicking with the mouse is switched to
3: a listing of thumbnails of running apps is displayed using a shortcut key (ALT+SHIFT+TAB), then the app selection state is switched using a shortcut key (ALT+TAB), and the app selected when the ALT key was released is switched to
4: a listing of thumbnails of running apps is displayed using a shortcut key (ALT+SHIFT+TAB), and then an app that has been selected from the listing by clicking with the mouse is switched to
5: a flip 3D display of running apps is displayed using a shortcut key (WINDOWS (registered trademark) key+TAB), then a selection is made using a shortcut key (WINDOWS (registered trademark) key+TAB), the app selection state is switched, and the app selected when the WINDOWS (registered trademark) was released is switched to
6: a flip 3D listing of running apps is displayed using a shortcut key (WINDOWS (registered trademark) key+TAB), and then an app selected from the listing by clicking with the mouse is switched to
7: a switch is made by clicking the title of the app to be switched to using the mouse
8: a switch is made by clicking a freely selected location within the window of the app to be switched to using the mouse
9: an app selected by clicking on an app displayed on the taskbar using the mouse is switched to 10: use of a shortcut key (ALT+Esc) causes the window of the currently active app to be minimized and the previously used app to be made active, thereby causing a switch Note that the switching operation may be limited to operations performed when switching between specific applications. For example, a switching operation between specific applications, such as a switch from a word processing application to a spreadsheet application, a switch from a web browser to another application, or a switch that starts up the mailer, may be set as the target operation.

Moreover, the following respective patterns may be established as the restoration operation. Note that the numeral listed at the beginning of each pattern is a broad category ID of the restoration operation, and the numerals (symbols) printed before each item from the second row onwards of each pattern are intermediate category IDs and fine category IDs of the restoration operation. A concatenation of the numerals (symbols) of the broad category, the intermediate category, and the fine category is employed as the ID of the restoration operation.

1: mouse operation by a fine movement pattern
   1: left-right, 2: circular, 3: other
2: mouse operation by a large movement pattern
   1: left-right, 2: circular, 3: other
3: repeated pressing of the same keyboard key
   1: a special key: (1) enter, (2) space, (3) an arrow
   2: an alphabet key: (1) left side, (2) central, (3) right side
   3: a number key
   4: another key
4: a single press of a keyboard key
   1: a special key: (1) enter, (2) space, (3) an arrow
   2: an alphabet key: (1) left side, (2) central, (3) right side
   3: a number key
   4: another key
5: another operation Note that it may be determined whether the mouse operation is fine or large based on the amount of mouse movement that has been extracted as the operation log. Moreover, for (1) left side, (2) central, and (3) right side of the alphabet keys, each key may be pre-allocated to (1) left side, (2) central, or (3) right side based on the placement of that key.

When email transmission is instructed, the appending section 22 identifies recent operation logs having "switch" as the "type" from out of the operation logs stored in the operation log DB 26. The appending section 22 searches for a pattern matching the operation indicated by the identified operation log amongst the plural switching operation patterns defined in the pattern DB 27, and identifies the ID of the matching pattern as a switching operation ID. Moreover, as the switching operation time, the appending section 22 acquires the time taken for that switching operation from the timing difference between the "start" and "end" of the operation log identified as the recent operation log having "switch" as the "type". Similarly, the appending section 22 identifies a recent operation log having "restoration" as the "type" from out of operation logs stored in the operation log DB 26. The appending section 22 searches for a pattern matching the operation indicated by the identified operation log amongst the plural restoration operation patterns defined in the pattern DB 27, and identifies the ID of the matched pattern as a restoration operation ID. Moreover, as the restoration operation time, the appending section 22 acquires the time taken for that restoration operation from the timing difference between the "start" and the "end" of the operation log identified as the recent operation log having "restoration" as the "type".

The appending section 22 generates operation trait information including the acquired switching operation ID, switching operation time, restoration operation ID, and restoration operation time. For example, the switching operation having ID=8 is identified as the recent switching operation, the switching operation time thereof is 0.3 seconds, the restoration operation having ID=3-1-(1) is identified as the recent restoration operation, and the restoration operation time thereof is 0.5 seconds. In such a case the appending section 22 generates operation trait information like (8, 0.3, 3-1-(1), 0.5).

Moreover, the appending section 22 uses an encryption key distributed in advance to perform encryption such as hashing the generated operation trait information, and appends this to the transmitted email using the mailer. Assuming that an email checker is introduced to the mailer installed in the terminal 20, the encryption key may, for example, be distributed by setting the email checker to store the same encryption key.

When email is transmitted from the terminal 20A, the email is transmitted with the encrypted operation trait information appended using the functionality of the extraction section 21 and the appending section 22. Note that the identification information of the terminal 20A (for example, the MAC address; referred to as the "terminal ID" hereafter) is also appended to the transmitted email using the functionality of the mailer.

The terminal 20B on the receiving side includes a terminal determination section 10 as a functional section related to the terminal determination system 100. The terminal determination section 10 is an example of a terminal determination device of technology disclosed herein. The terminal determination section 10 includes an acquisition section 11 and a determination section 12.

When the email is received by the mailer running on the terminal 20B, the acquisition section 11 acquires the operation trait information and the terminal ID appended to the received email. The acquisition section 11 decrypts the acquired operation trait information using the encryption key distributed in advance, and passes the decrypted operation trait information to the determination section 12 along with the terminal ID.

The determination section 12 determines whether or not the terminal 20A that is the transmission source of the email is an authorized terminal based on the operation trait information passed from the acquisition section 11 and the operation trait information DB 16. Note that the "authorized terminal" is an example of a "specific terminal" of technology disclosed herein, and in the first exemplary embodiment, the "authorized terminal" refers to the terminal operated by the authorized user of the terminal 20A.

Figure 3:
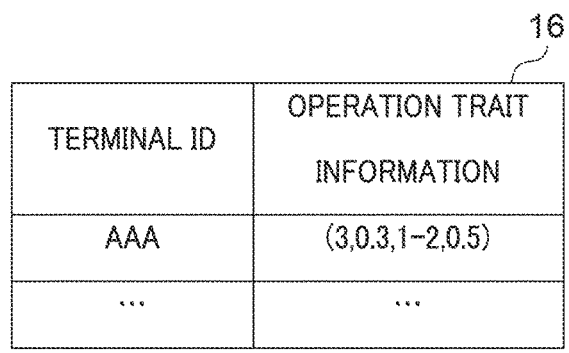
FIG. 3 is a diagram illustrating an example of an operation trait information DB of the first exemplary embodiment.

The operation trait information DB 16 is stored on the shared server 18 connected to the terminal 20B through the network. As illustrated in FIG. 3, the operation trait information DB 16 stores the "terminal ID" and the "operation trait information" associated with each other. The operation trait information associated with the terminal ID represents operation trait information related to the terminal 20A indicated by the terminal ID when operated by the authorized user. Note that a single terminal ID in the operation trait information DB 16 may be stored associated with plural pieces of operation trait information.

More specifically, the determination section 12 searches the operation trait information DB 16 for the operation trait information corresponding to the terminal ID matching the terminal ID passed from the acquisition section 11. The determination section 12 then determines whether or not the operation trait information passed from the acquisition section 11 belongs in a particular range of similarity with the operation trait information found from the operation trait information DB 16. Cases in which they belong in a range of similarity, for example, be cases in which the switching operation IDs match and the difference between the switching operation times is within a particular range (for example, 20% or less), and the restoration operation IDs match and the difference between the restoration operation times is within a particular range (for example, 20% or less). Note that determination as to whether or not the operation trait information belong in a range of similarity is not limited to this example. For example, another basis may be employed, such as whether or not the switching operation IDs or the restoration operation IDs match, and whether or not the difference between the operation times of those that match is within a particular range.

In cases in which the operator of the terminal 20A is different, there is a high probability that the operation trait information appended to the email transmitted from that terminal 20A will be different. Namely, cases in which the operation trait information passed from the acquisition section 11 does not belong in a particular range of similarity with the operation trait information found from the operation trait information DB 16, may be regarded as cases in which, for example, the terminal 20A that is the email transmission source has been hijacked by an unauthorized user who then transmitted the email. Thus, the determination section 12 determines that the terminal 20A that is the email transmission source is an authorized terminal when they belong in a range of similarity, and determines that the terminal 20A that is the email transmission source is not an authorized terminal when they do not belong in a range of similarity.

Note that in cases in which plural pieces of operation trait information that correspond to the terminal ID matching the terminal ID passed from the acquisition section 11 are stored in the operation trait information DB 16, determination may be made as to whether or not any of the pieces of operation trait information belong in a particular range of similarity.

In cases in which the determination section 12 determines that the terminal 20A that is the email transmission source is not an authorized terminal, a message stating this is, for example, displayed on a display device provided to the terminal 20B, and alert processing is performed. Moreover, in cases in which the determination section 12 determines that the terminal 20A that is the email transmission source is an authorized terminal, this is notified to the mailer. In such cases, ordinary email processing is performed by the mailer.

Moreover, in cases in which the determination section 12 determines that the terminal 20A that is the email transmission source is an authorized terminal, a combination of the terminal ID passed from the acquisition section 11 and the operation trait information is transmitted to the shared server 18. In the shared server 18, the combination of the received terminal ID and operation trait information is added to the operation trait information DB 16. Accordingly, combinations of terminal IDs and operation trait information received from plural terminals 20B may be aggregated and collected in the operation trait information DB 16 of the shared server 18, and information in the operation trait information DB 16 may be shared with and employed by the plural terminals 20B. Thus, even if, for example, the transmission source of the email received by a given terminal 20B is a new terminal 20A for that terminal 20B, the operation trait information DB 16 stored on the shared server 18 can be referenced, and determination can be made as to whether or not the terminal is authorized. Terminals 20B that share a single shared server 18 may, for example, be terminals 20B belonging to a particular group such as terminals connected over an in-company local area network (LAN).

Figure 4:
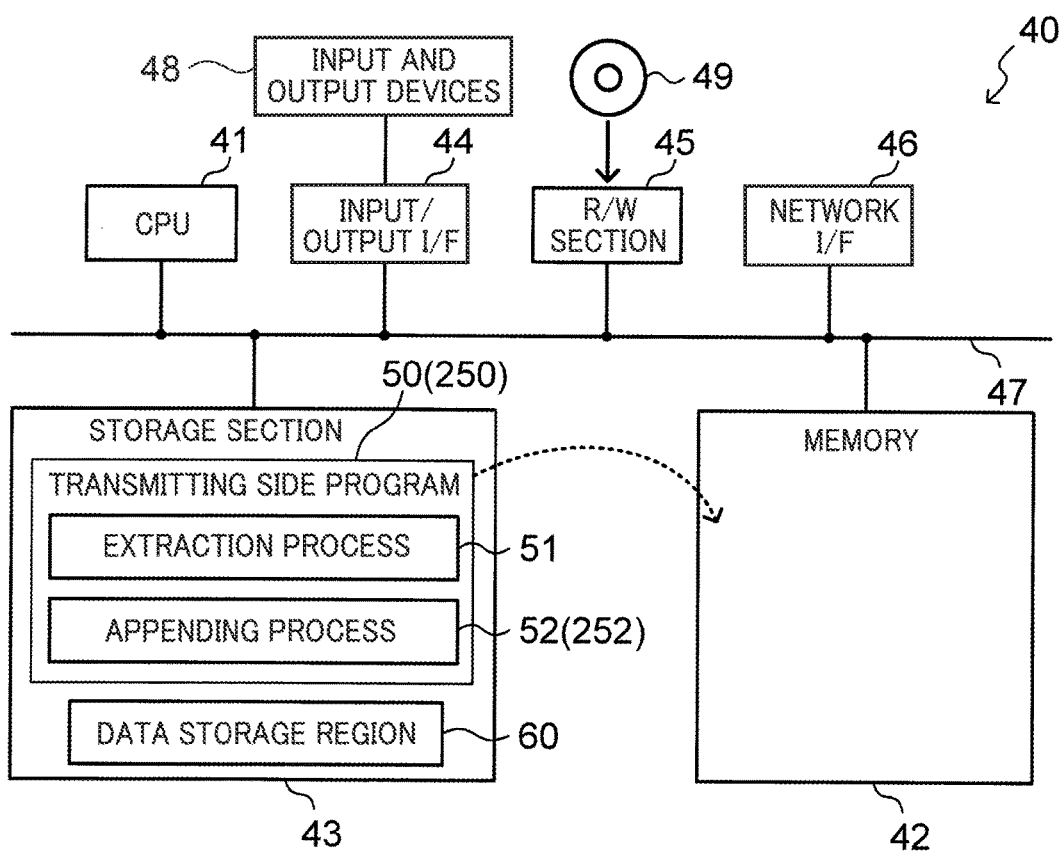
FIG. 4 is a block diagram illustrating a schematic configuration of a computer that functions as a transmitting side terminal.

The terminal 20A may, for example, be implemented by a computer 40 illustrated in FIG. 4. The computer 40 includes a CPU 41, memory 42 serving as a temporary storage region, and a non-volatile storage section 43. The computer 40 also includes an input/output interface (I/F) 44 to which input and output devices 48, such as a display device and an input device, are connected. The computer 40 also includes a read/write (R/W) section 45 that controls reading and writing of data from and to a recording medium 49, and a network I/F 46 connected to a network such as the internet. The CPU 41, the memory 42, the storage section 43, the input/output I/F 44, the R/W section 45, and the network I/F 46 are connected to one another through a bus 47.

The storage section 43 may be implemented by a hard disk drive (HDD), a solid state drive (SSD), flash memory, or the like. A transmitting side program 50 that causes the computer 40 to function as the terminal 20A may be stored in the storage section 43 serving as a recording medium. Moreover, the storage section 43 includes a data storage region 60 that stores the data configuring both the operation log DB 26 and the pattern DB 27. Note that, although omitted from the drawings, the storage section 43 also stores programs, data, and the like related to other applications that run on the terminal 20A.

The CPU 41 reads the transmitting side program 50 from the storage section 43, expands the transmitting side program 50 into the memory 42, and sequentially executes processes included in the transmitting side program 50. Moreover, the CPU 41 reads the data from the data storage region 60, and expands both the operation log DB 26 and the pattern DB 27 into the memory 42.

The transmitting side program 50 includes an extraction process 51 and an appending process 52. The CPU 41 operates as the extraction section 21 illustrated in FIG. 1 by executing the extraction process 51. Moreover, the CPU 41 operates as the appending section 22 illustrated in FIG. 1 by executing the appending process 52. The computer 40 that executes the transmitting side program 50 thereby functions as the terminal 20A.

Figure 5:
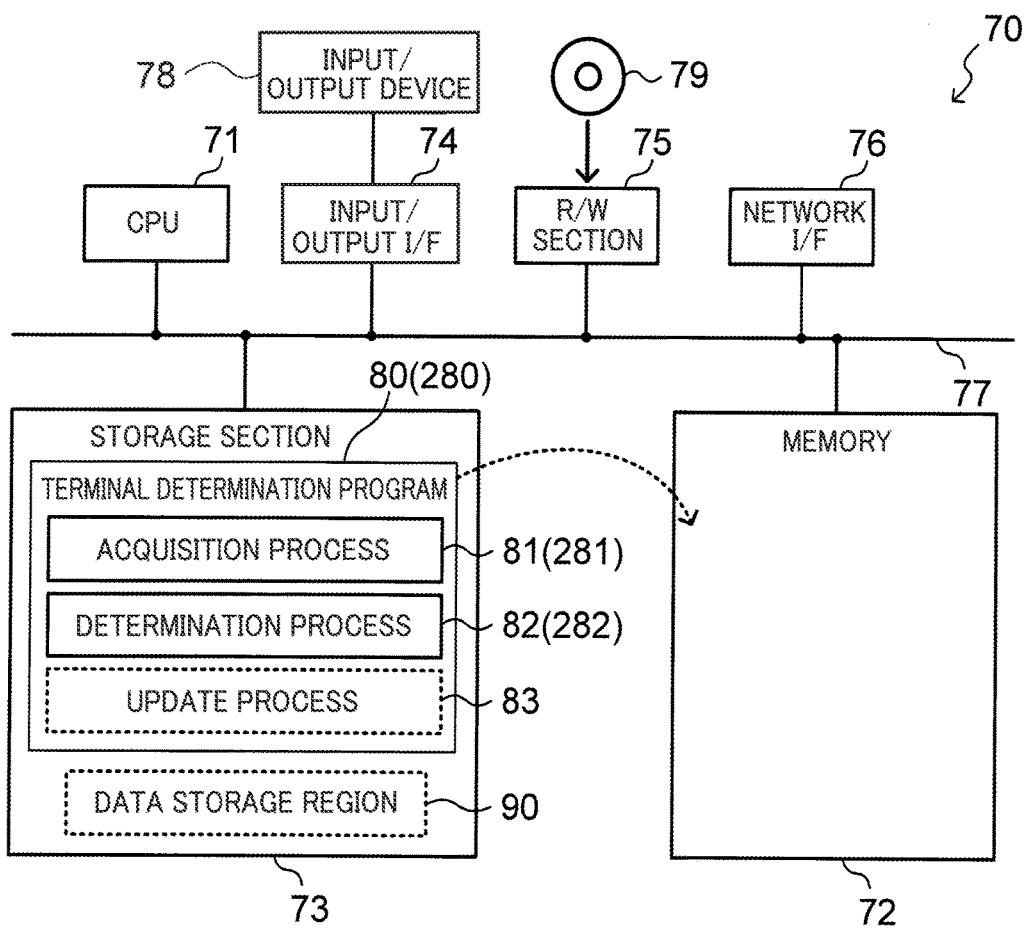
FIG. 5 is a block diagram illustrating a schematic configuration of a computer that functions as a terminal determination section of a receiving side terminal.

The terminal 20B may, for example, be implemented by a computer 70 illustrated in FIG. 5. The computer 70 includes a CPU 71, memory 72, and a storage section 73. Moreover, the computer 70 includes an input/output I/F 74 to which an input/output device 78 is connected, an R/W section 75 that controls reading and writing of data from and to a recording medium 79, and a network I/F 76. The CPU 71, the memory 72, the storage section 73, the input/output I/F 74, the R/W section 75, and the network I/F 76 are connected to one another through a bus 77.

The storage section 73 may be implemented by an HDD, an SSD, flash memory, or the like. A terminal determination program 80 that causes the computer 70 to function as the terminal determination section 10 of the terminal 20B may be stored on the storage section 73 serving as a storage medium. Note that, although omitted from the drawings, the storage section 73 also stores programs, data, and the like related to other applications running on the terminal 20B.

The CPU 71 reads the terminal determination program 80 from the storage section 73, expands the terminal determination program 80 into the memory 72, and sequentially executes processes included in the terminal determination program 80.

The terminal determination program 80 includes an acquisition process 81 and a determination process 82. The CPU 71 operates as the acquisition section 11 illustrated in FIG. 1 by executing the acquisition process 81. Moreover, the CPU 71 operates as the determination section 12 illustrated in FIG. 1 by executing the determination process 82. The computer 70 that executes the terminal determination program 80 thereby functions as the terminal determination section 10 of the terminal 20B.

Note that the functionality implemented by the transmitting side program 50 and the terminal determination program 80 can also be implemented by, for example, a semiconductor integrated circuit, and more specifically, by an application specific integrated circuit (ASIC).

Next, explanation follows regarding operation of the terminal determination system 100 according to the first exemplary embodiment.

Figure 6:
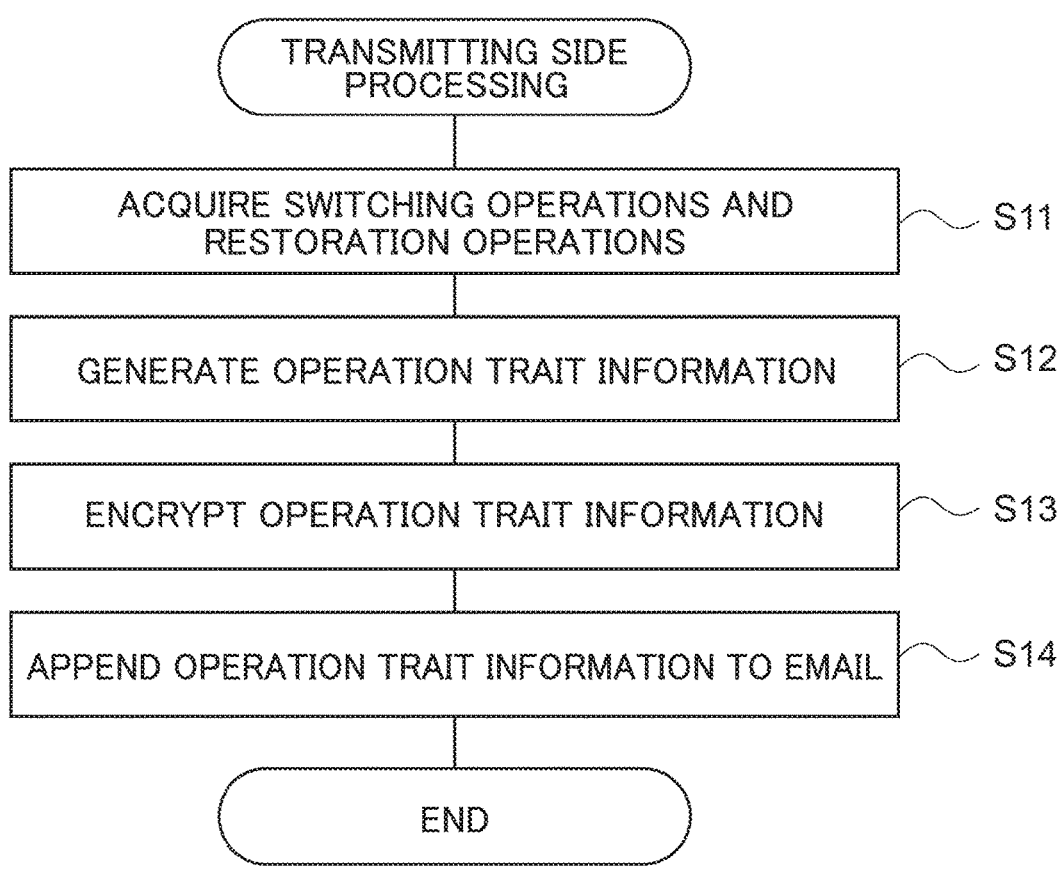
FIG. 6 is a flowchart illustrating an example of transmitting side processing.
Figure 7:
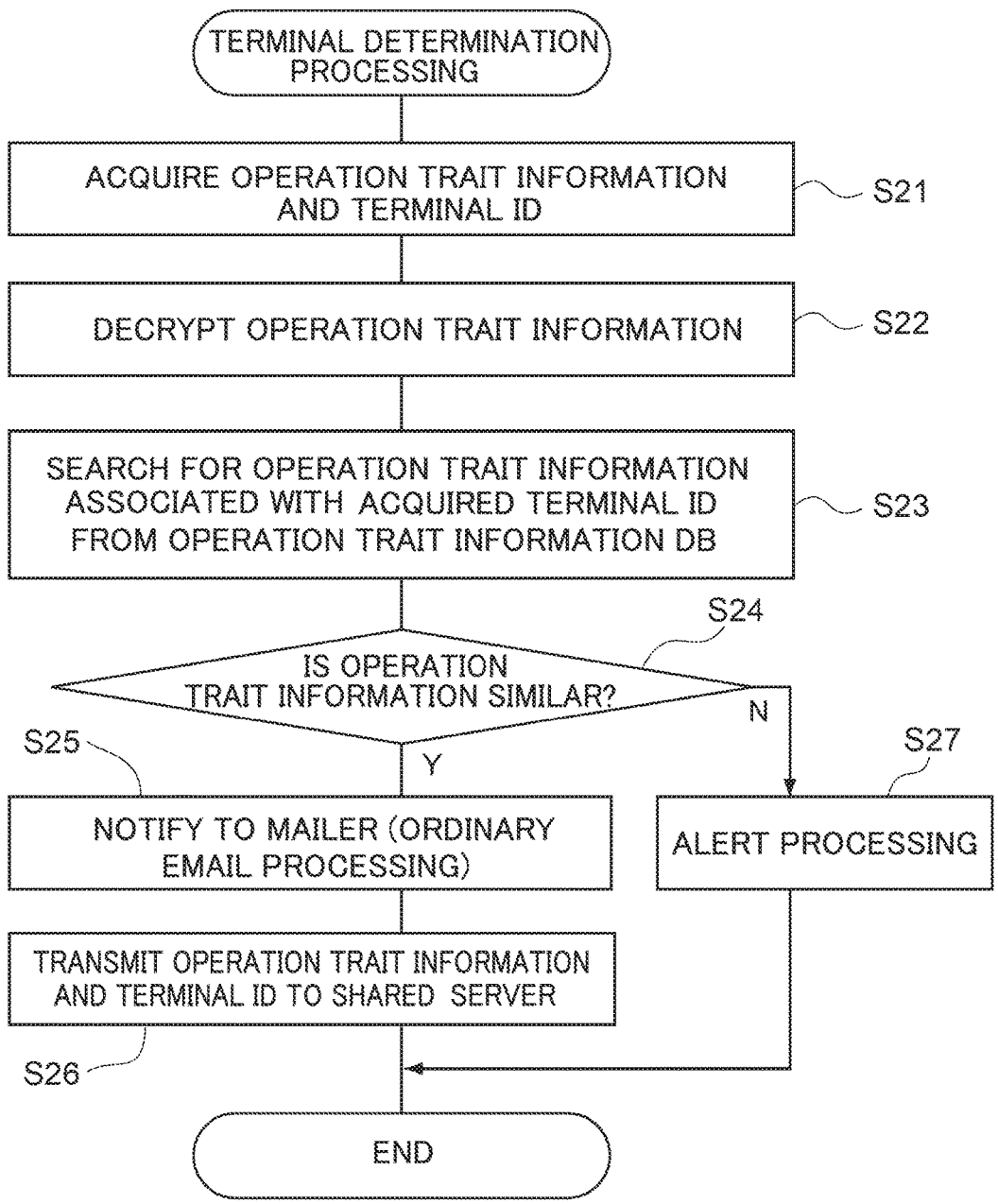
FIG. 7 is a flowchart illustrating an example of terminal determination processing of the first exemplary embodiment.

On the terminal 20A, the extraction section 21 monitors user operations on the terminal 20A, extracts the operation logs of the target operation, and stores the operation logs of the target operation in the operation log DB 26. Moreover, when an email is transmitted by the mailer installed on the terminal 20A, the transmitting side processing illustrated in FIG. 6 is executed on the terminal 20A. Then, when the email transmitted from the terminal 20A is received, the terminal determination processing illustrated in FIG. 7 is executed on the terminal 20B. Detailed explanation follows regarding each processing.

At step S11 of the transmitting side processing illustrated in FIG. 6, the appending section 22 identifies recent switching operations from the operation log DB 26, and acquires the switching operation times together with the switching operation IDs. Moreover, the appending section 22 identifies recent restoration operations from the operation log DB 26, and acquires the restoration operation times together with the restoration operation IDs.

Next, at step S12, the appending section 22 generates the operation trait information that includes the acquired switching operation IDs, switching operation times, restoration operation IDs, and restoration operation times. Next, at step S13, the appending section 22 encrypts the generated operation trait information using the encryption key that was distributed in advance. Next, at step S14, the appending section 22 appends the encrypted operation trait information to the email to be transmitted by the mailer, and the transmitting side processing ends.

The email to which the encrypted operation trait information was appended is thereby transmitted by the mailer of the terminal 20A together with the terminal ID of the terminal 20A.

Next, at step S21 of the terminal determination processing illustrated in FIG. 7, the acquisition section 11 acquires the operation trait information and the terminal ID appended to the email received by the mailer running on the terminal 20B.

Next, at step S22, the acquisition section 11 decrypts the acquired operation trait information using the encryption key that was distributed in advance, and passes the decrypted operation trait information to the determination section 12 along with the terminal ID.

Next, at step S23, the determination section 12 searches the operation trait information DB 16 for operation trait information corresponding to the terminal ID matching the terminal ID passed from the acquisition section 11. Next, at step S24, the determination section 12 determines whether or not the operation trait information passed from the acquisition section 11 belong in a particular range of similarity with the operation trait information found from the operation trait information DB 16. In cases in which they belong in a range of similarity, the determination section 12 determines that the terminal 20A that is the email transmission source is an authorized terminal, and processing transitions to step S25. However, in cases in which they do not belong in a range of similarity, the determination section 12 determines that the terminal 20A that is the email transmission source is not an authorized terminal, and processing transitions to step S27.

At step S25, the determination section 12 notifies the mailer that the terminal 20A that is the email transmission source is an authorized terminal. Ordinary email processing is performed by the mailer accordingly. Next, at step S26, the determination section 12 transmits to the shared server 18 a combination of the terminal ID and the operation trait information passed from the acquisition section 11. On the shared server 18, the received combination of the terminal ID and the operation trait information is added to the operation trait information DB 16. The terminal determination processing then ends.

At step S27, however, the determination section 12, for example, displays a message stating that the terminal 20A that is the email transmission source is not an authorized terminal on the display device provided to the terminal 20B, performs alert processing, and the terminal determination processing ends.

As explained above, according to the terminal determination system of the first exemplary embodiment, in the terminal on the email transmitting side, operation trait information related to application switching operations and restoration from screen lock operations, in which traits of operation show readily for each user, is appended to the email to be transmitted. At the receiving side, it is determined whether or not the terminal that is the email transmission source is an authorized terminal by comparing the operation trait information appended to the received email against the pre-stored operation trait information associated with the terminal ID. The operation trait information is target operations extracted from ordinary operation, rather than a specific operation forced on the user. Accordingly, it can be determined whether or not a communication target terminal is a specific terminal without placing burden on the user.

Using information related to operations performed when switching applications and operations performed when restoring from screen lock, in which traits of individual users show readily, as the operation trait information enables authenticity to be determined with high accuracy when, for example, an attacker takes over a terminal and sends an email.

Encrypting the operation trait information and appending the encrypted operation trait information to the email enables the operation trait information to be prevented from being intercepted or the like on the network.

Explanation has been given of a case in which the pattern DB 27 is referenced and an ID is generated by the extraction section 21 of the terminal 20A when the operation logs of the target operations are extracted and the operation trait information is generated by the appending section 22 in the first exemplary embodiment. However, there is no limitation thereto. Configuration may be made such that the pattern DB 27 is referenced and the ID is generated and then stored when the operation log extracted by the extraction section 21 is stored in the operation log DB 26.

Explanation has been given in which the terminal 20A at the transmitting side is distinguished from the terminal 20B at the receiving side in the first exemplary embodiment.

However, configuration may be made such that functionality of the transmitting side (the extraction section 21 and the appending section 22) and functionality of the receiving side (the terminal determination section 10) are possessed by a single terminal 20. Moreover, the functionality of the transmitting side and the functionality of the receiving side can be installed on the terminal 20 as a part of the email checker functionality.

Second Exemplary Embodiment

Next, detailed explanation follows regarding a second exemplary embodiment. In the second exemplary embodiment, explanation is given regarding a terminal determination system that, when a message is posted to a social networking service (SNS) from a terminal, determines whether or not the terminal that transmitted the message is a specific terminal at the administrator side of the SNS. Note that portions similar to those of the terminal determination system 100 according to the first exemplary embodiment are allocated the same reference numerals and detailed explanation thereof is omitted.

Figures 8, 9:
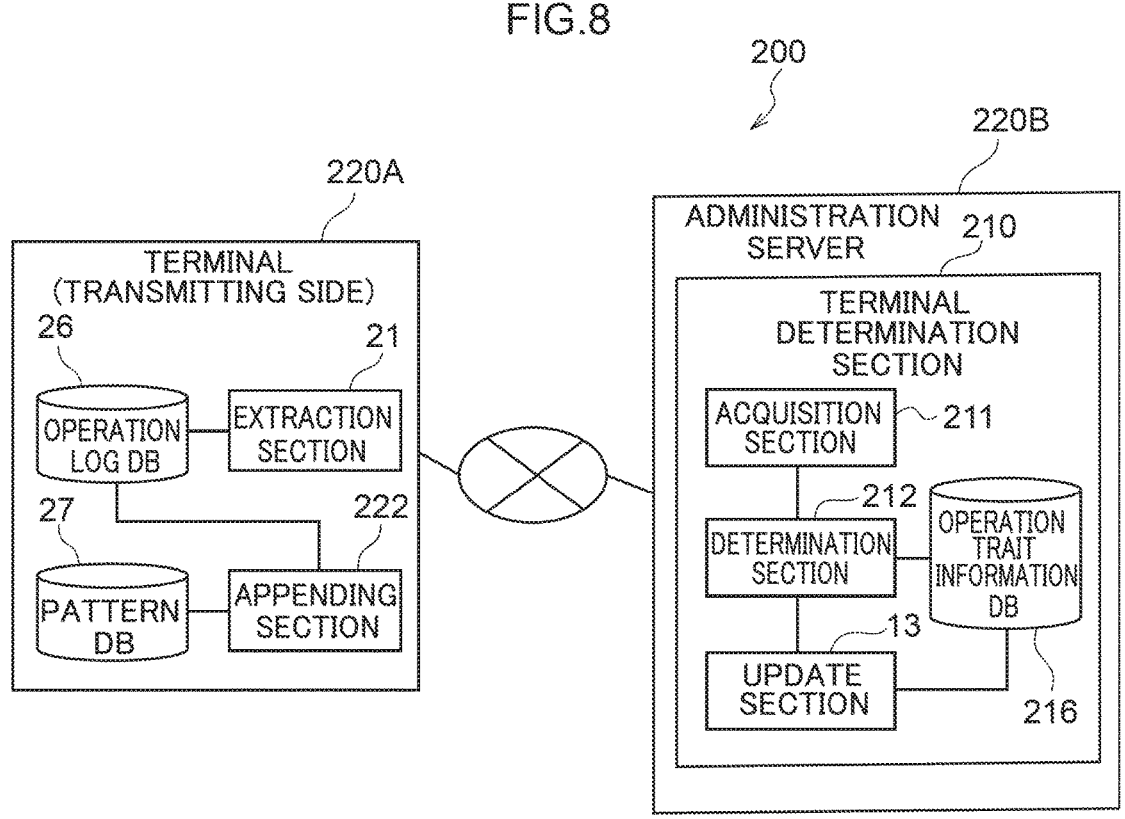
FIG. 8 is a functional block diagram illustrating a schematic configuration of a terminal determination system according to a second exemplary embodiment.
FIG. 9 is a diagram illustrating an example of an operation trait information DB of the second exemplary embodiment.

As illustrated in FIG. 8, a terminal determination system 200 according to the second exemplary embodiment includes a terminal 220A and an administration server 220B connected together through a network. Note that although FIG. 8 depicts only a single terminal 220A, plural of the terminal 220A may be included. Moreover, plural of the administration server 220B may be included for each SNS service.

Similarly to the terminal 20A of the first exemplary embodiment, plural applications run on the terminal 220A. The terminal 220A of the second exemplary embodiment includes functionality for posting messages on an SNS. The SNS may be a service provided by a specific application, or may be a service provided through a web browser.

The terminal 220A includes an extraction section 21 and an appending section 222 serving as functional sections related to the terminal determination system 200.

The appending section 222 appends generated operation trait information to an SNS message rather than to an email. Moreover, the encryption key employed when the operation trait information is encrypted may be distributed from the administration server 220B when, for example, usage of the SNS is registered by a user, a tool is updated, or permission is given to transmit a message. In other respects, the appending section 222 is similar to the appending section 22 of the first exemplary embodiment.

Since the SNS message is posted from the terminal 220A using the functionality of the extraction section 21 and the appending section 222, the message is transmitted with the encrypted operation trait information appended thereto when a message is transmitted to the administration server 220B. Note that the terminal ID of the terminal 220A and the user identification information employed by the SNS (the "user ID" hereafter) are also appended to the transmitted message.

The administration server 220B performs processing such as posting the SNS message transmitted from the terminal 220A to the interne. Moreover, the administration server 220B includes a terminal determination section 210 serving as a functional section related to the terminal determination system 200. The terminal determination section 210 is an example of a terminal determination device of technology disclosed herein. The terminal determination section 210 includes an acquisition section 211, a determination section 212, and an update section 13. Moreover, an operation trait information DB 216 is stored in a particular storage region of the administration server 220B.

When a message transmitted from the terminal 220A is received, the acquisition section 211 acquires the operation trait information, the terminal ID, and the user ID appended to the received message. The acquisition section 211 uses the encryption key that was distributed in advance to decrypt the acquired operation trait information, and passes the decrypted operation trait information to the determination section 212 together with the terminal ID and the user ID.

The determination section 212 determines whether or not the sender of the message is an authorized user based on the operation trait information passed from the acquisition section 211 and the operation trait information DB 216. Note that when being operated by an "authorized user", the terminal 220A is an example of a "specific terminal" of the technology disclosed herein.

As illustrated in FIG. 9, the "terminal ID", the "user ID", and the "operation trait information" are stored associated with one another in the operation trait information DB 216. The operation trait information associated with the terminal ID and the user ID represents the operation trait information when the terminal 220A indicated by the terminal ID is operated by the authorized user indicated by the user ID. Since a single user may use the same SNS from a different terminal 220A, for a single user ID, the operation trait information DB 216 stores operation trait information in association with each different terminal ID. Note that plural pieces of operation trait information may be stored associated with each single combination of a terminal ID and a user ID in the operation trait information DB 216.

More specifically, the determination section 212 searches the operation trait information DB 216 for the operation trait information corresponding to the terminal ID and the user ID matching the terminal ID and the user ID passed from the acquisition section 211. The determination section 212 then determines whether or not the sender of the message is an authorized user by determining whether or not the operation trait information passed from the acquisition section 211 belongs in a particular range of similarity with that found from the operation trait information DB 216. Determination as to whether or not they belong in a range of similarity is similar to the determination method of the determination section 12 of the first exemplary embodiment.

In cases in which it has been determined that the sender of the message is not an authorized user, the determination section 212, for example, returns an alert message to the terminal 220A at the transmitting side, and performs alert processing without posting (publishing) the message transmitted from the terminal 220A. Moreover, in cases in which it has been determined that the sender of the message is an authorized user, the determination section 212 notifies this to an SNS processing section, not illustrated in the drawings. In such cases, in the SNS processing section, ordinary message processing is performed, and the message transmitted from the terminal 220A is posted (published).

In cases in which it has been determined that the sender of the message is an authorized user, the determination section 212 passes to the update section 13 the combination of the terminal ID, the user ID, and the operation trait information passed from the acquisition section 211.

The update section 13 adds to the operation trait information DB 216 the combination of the terminal ID, the user ID, and the operation trait information that were passed. Moreover, the update section 13 erases any operation trait information for which a specific time has elapsed since being stored in the operation trait information DB 216 (for example, 2 or 3 weeks). The method by which the user performs operations on the terminal 220A sometimes changes as time elapses. Old operation trait information is therefore deleted from the operation trait information DB 216 as newly acquired operation trait information is added to the operation trait information DB 216, causing changes in the operation method of the user to be tracked.

The terminal 220A may, for example, be implemented by the computer 40 illustrated in FIG. 4. A transmitting side program 250 that causes the computer 40 to function as the terminal 220A is stored in the storage section 43. The transmitting side program 250 includes the extraction process 51 and an appending process 252.

The CPU 41 operates as the extraction section 21 illustrated in FIG. 8 by executing the extraction process 51. The CPU 41 also operates as the appending section 222 illustrated in FIG. 8 by executing the appending process 252. The computer 40 that executes the transmitting side program 250 thereby functions as the terminal 220A.

The administration server 220B may, for example, be implemented by the computer 70 illustrated in FIG. 5. A terminal determination program 280 that causes the computer 70 to function as the terminal determination section 210 of the administration server 220B is stored in the storage section 73. Moreover, the storage section 73 includes a data storage region 90 that stores data configuring the operation trait information DB 216. The terminal determination program 280 includes an acquisition process 281, a determination process 282, and an update process 83.

The CPU 71 operates as the acquisition section 211 illustrated in FIG. 8 by executing the acquisition process 281. The CPU 71 also operates as the determination section 212 illustrated in FIG. 8 by executing the determination process 282. The CPU 71 also operates as the update section 13 illustrated in FIG. 8 by executing the update process 83. The computer 70 executing the terminal determination program 280 thereby functions as the terminal determination section 210 of the administration server 220B.

Note that the functionality implemented by the transmitting side program 250 and the terminal determination program 280 may be implemented by, for example, a semiconductor integrated circuit, and more specifically by an ASIC or the like.

Next, explanation follows regarding operation of the terminal determination system 200 according to the second exemplary embodiment.

The transmitting side processing is executed on the terminal 220A. The transmitting side processing of the second exemplary embodiment only differs from the transmitting side processing of the first exemplary embodiment in that the generated operation trait information is appended to an SNS message at step S14 rather than to an email, and detailed explanation thereof is therefore omitted. When the message transmitted from the terminal 220A is received by the administration server 220B, the terminal determination section 210 of the administration server 220B executes the terminal determination processing illustrated in FIG. 10.

Figure 10:
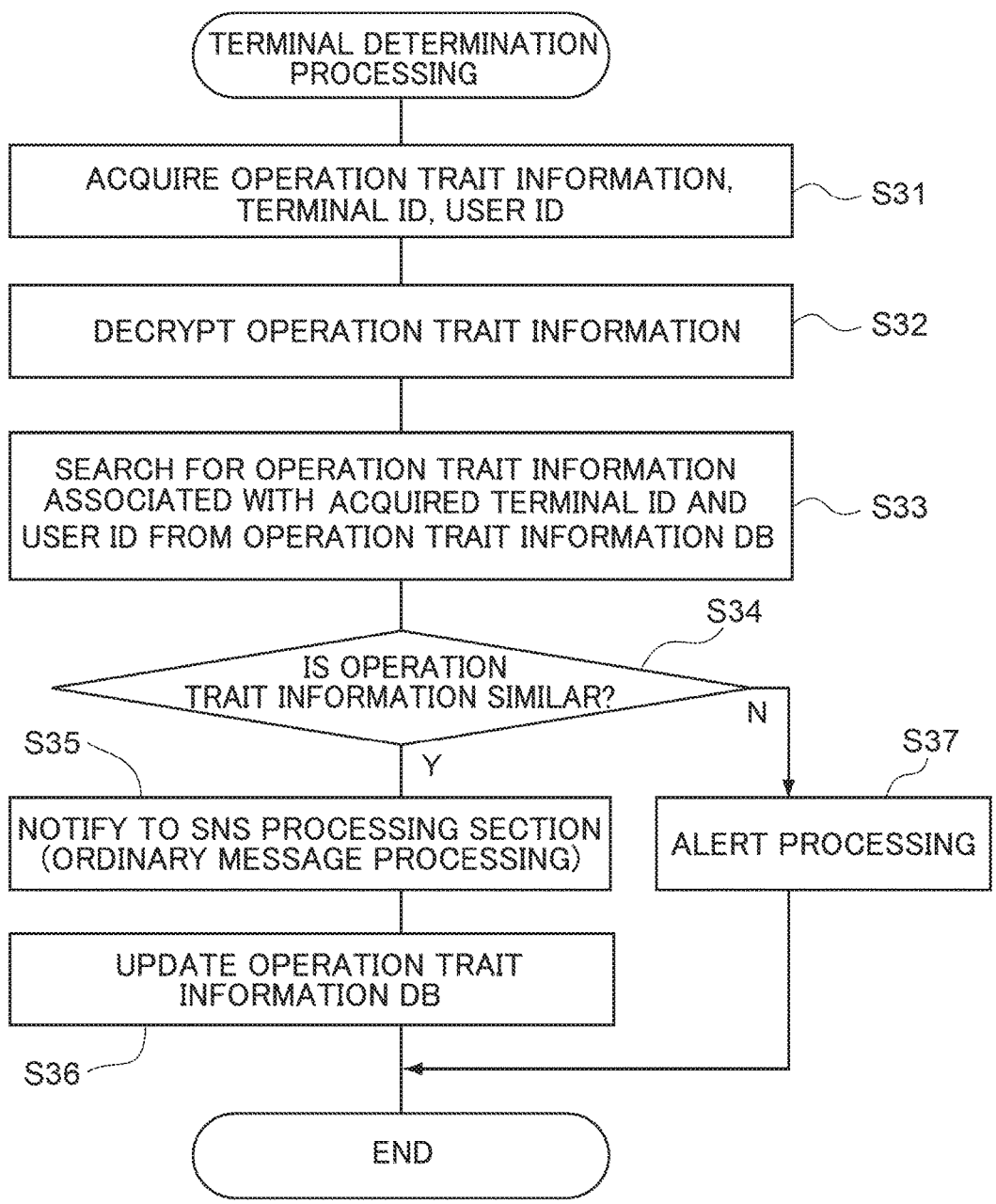
FIG. 10 is a flowchart illustrating an example of terminal determination processing of the second exemplary embodiment.

At step S31 of the terminal determination processing illustrated in FIG. 10, the acquisition section 211 acquires the operation trait information, the terminal ID, and the user ID appended to the message transmitted from the terminal 220A.

Next, at step S32, the acquisition section 211 uses the encryption key that was distributed in advance to decrypt the acquired operation trait information, and passes the decrypted acquired operation trait information to the determination section 212 together with the terminal ID and the user ID.

Next, at step S33, the determination section 212 searches the operation trait information DB 16 for the operation trait information corresponding to the terminal ID and user ID matching the terminal ID and user ID passed from the acquisition section 211. Next, at step S34, the determination section 212 determines whether or not the operation trait information passed from the acquisition section 211 belongs in a particular range of similarity with the operation trait information found from the operation trait information DB 216. In cases in which they belong in a range of similarity, the determination section 212 determines that the sender of the message is an authorized user, and processing transitions to step S35. However, in cases in which they do not belong in a range of similarity, the determination section 212 determines that the sender of the message is not an authorized user, and processing transitions to step S37.

At step S35, the determination section 212 notifies the SNS processing section that the sender of the message is an authorized user. Thus, ordinary message processing is performed in the SNS processing section, and the message is posted.

Next, at step S36, the determination section 212 passes to the update section 13 the combination of the terminal ID, the user ID, and the operation trait information passed from the acquisition section 211. The update section 13 adds to the operation trait information DB 216 the combination of the terminal ID, the user ID, and the operation trait information that was passed. Moreover, the update section 13 erases any operation trait information for which a specific time has elapsed since it was stored in the operation trait information DB 216. The terminal determination processing then ends.

At step S37 however, the determination section 212, for example, responds to the terminal 220A at the transmitting side with an alert message without posting (publishing) the message transmitted from the terminal 220A, and performs alert processing. The terminal determination processing then ends.

As explained above, according to the terminal determination system of the second exemplary embodiment, operation trait information regarding switching operations and restoration operations are employed similarly to in the first exemplary embodiment. Moreover, the operation trait information is also associated with the user ID and stored in the operation trait information DB. It can therefore be determined whether or not the received message is a message transmitted by an authorized user operating a specific terminal, without forcing a specific operation on the user. Namely, it can be determined whether or not a communication target terminal is a specific terminal without placing burden on the user.

Note that in the second exemplary embodiment also, a shared server may be provided, and an operation trait information DB may be stored on the shared server, similarly to in the first exemplary embodiment. Moreover, in the first exemplary embodiment also, old operation trait information stored in the operation trait information DB may be deleted by the updating section, similarly to in the second exemplary embodiment.

In the second exemplary embodiment, explanation has been given regarding a case in which the combination of the terminal ID and the user ID are associated with operation trait information from when the user indicated by the user ID has operated the terminal indicated by the terminal ID. However, the operation trait information may be associated with the user ID alone. In such cases, it can be determined whether or not the sender of the message is an authorized user irrespective of which terminal the user was operating. Note that since plural pieces of operation trait information can be stored associated with a single user ID in the operation trait information DB, operation trait information can be associated with a single user from when the user has operated plural different terminals. Accordingly, even when the operation trait information is associated with the user ID alone, it is sufficient to determine whether or not the operation trait information acquired from the message belongs in a particular range of similarity with any of the operation trait information corresponding to the user ID.

Moreover, although explanation has been given of a case in which the operation trait information is appended to the "email" in the first exemplary embodiment, and the "SNS message" in the second exemplary embodiment, there is no limitation to these examples. A method may be employed in which operation trait information on the transmitting side terminal is attached to any communication from a terminal and delivered to the receiving side terminal (including administration servers).

As described above, the operation trait information can be used to determine whether or not the terminal that is the message transmission source is a specific terminal, and more specifically, to determine whether or not the terminal is being operated on by an authorized user, thus enabling confirmation of the user identity to also be performed when, for example, making a purchase or registering on an internet service.

Note that although explanation has been given of a mode in which the transmitting side program 50, 250 and the terminal determination program 80, 280 is pre-stored (installed) on the storage section 43, 73, there is no limitation thereto. The determination program according to technology disclosed herein may be provided in a mode recorded on the recording medium such as a CD-ROM, DVD-ROM, or USB memory.

In technology that acquires biometric traits of the user, such as in related technology, it is assumed that a specific operation is forced on the user. Forcing a specific operation on the user in this manner places a burden on the user.

One aspect of technology disclosed herein enables it to be determined whether or not a communication target terminal is a specific terminal without placing burden on a user.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal determination device comprising:
   a processor configured to execute a procedure, the procedure comprising:
   acquiring a terminal ID of a terminal, and operation information indicating a history of operation that has taken place on the terminal; and
   comparing the acquired operation information with operation information stored in a memory associated with the terminal ID, and, when the acquired operation information belongs in a particular range of similarity with the stored operation information, determining that the terminal is an authorized terminal corresponding to the terminal ID, wherein in the procedure:
   a user of the authorized terminal is also stored associated with the operation information; and
   when determining whether or not the terminal is the authorized terminal, determination is made as to whether or not the terminal is the authorized terminal operated by the user according to whether or not the acquired operation information belongs in a particular range of similarity with operation information stored associated with the terminal and the user,
   wherein in the procedure, the operation information is information indicating operation traits related to starting up, closing, or switching of an application on the terminal, or restoration from screen lock, or the operation information is information indicating a combination of operations related to starting up, closing, or switching of the application on the terminal, or restoration from screen lock,
   adding the acquired operation information to the operation information stored associated with the authorized terminal, and also erasing operation information, for which a specific time has elapsed since being stored, from the operation information associated with the authorized terminal, and
   issuing an alert when the terminal is not an authorized terminal.

2. The terminal determination device of claim 1, wherein in the procedure, the operation information includes operation identification information appended for each of the operation traits, and a time taken for the operation.

3. The terminal determination device of claim 1, wherein in the procedure, acquisition of the operation information is acquisition of the operation information appended to a message transmitted from the terminal.

4. The terminal determination device of claim 1, wherein in the procedure, the operation information is information encrypted using predetermined key information.

5. The terminal determination device of claim 1, wherein in the procedure, the operation information is stored in a shared storage section that is shared between a plurality of respective terminal determination devices.

6. A non-transitory computer readable recording medium storing a terminal determination program that causes the computer to execute a process comprising:
   acquiring a terminal ID of a terminal, and operation information indicating history of operation that has taken place on the terminal; and
   by a processor, comparing the acquired operation information with operation information stored in a memory associated with the terminal ID, and, when the acquired operation information belongs in a particular range of similarity with the stored operation information, determining that the terminal is an authorized terminal corresponding to the terminal ID, wherein:
   a user of the authorized terminal is also stored associated with the operation information; and
   when determining whether or not the terminal is the authorized terminal, determination is made as to whether or not the terminal is the authorized terminal operated by the user according to whether or not the acquired operation information belongs in a particular range of similarity with operation information stored associated with the terminal and the user, wherein the operation information is information indicating operation traits related to starting up, closing, or switching of an application on the terminal, or restoration from screen lock, or the operation information is information indicating a combination of operations related to starting up, closing, or switching of the application on the terminal, or restoration from screen lock, adding the acquired operation information to the operation information stored associated with the authorized terminal, and also erasing operation information, for which a specific time has elapsed since being stored, from the operation information associated with the authorized terminal, and issuing an alert when the terminal is not an authorized terminal.

7. The non-transitory computer readable recording medium of claim 6, wherein the operation information includes operation identification information appended for each of the operation traits, and a time taken for the operation.

8. The non-transitory computer readable recording medium of claim 6, wherein acquisition of the operation information is acquisition of the operation information appended to a message transmitted from the terminal.

9. The non-transitory computer readable recording medium of claim 6, wherein the operation information is information encrypted using predetermined key information.

10. The non-transitory computer readable recording medium of claim 6, wherein the operation information is stored in a shared storage section that is shared between a plurality of respective terminal determination devices that execute the terminal determination program.

11. A terminal determination method comprising:
acquiring a terminal ID of a terminal, and operation information indicating history of operation that has taken place on the terminal; and
comparing the acquired operation information with operation information stored in a memory associated with the terminal ID, and, when the acquired operation information belongs in a particular range of similarity with the stored operation information, determining that the terminal is an authorized terminal corresponding to the terminal ID, wherein in the method:
a user of the authorized terminal is also stored associated with the operation information; and
when determining whether or not the terminal is the authorized terminal, determination is made as to whether or not the terminal is the authorized terminal operated by the user according to whether or not the acquired operation information belongs in a particular range of similarity with operation information stored associated with the terminal and the user,
wherein the operation information is information indicating operation traits related to starting up, closing, or switching of an application on the terminal, or restoration from screen lock, or the operation information is information indicating a combination of operations related to starting up, closing, or switching of the application on the terminal, or restoration from screen lock,
adding the acquired operation information to the operation information stored associated with the authorized terminal, and also erasing operation information, for which a specific time has elapsed since being stored, from the operation information associated with the authorized terminal, and
issuing an alert when the terminal is not an authorized terminal.

12. The terminal determination method of claim 11, wherein in the method, the operation information is information indicating operation traits related to starting up, closing, or switching of an application on the terminal, or restoration from screen lock, or the operation information is information indicating a combination of operations related to starting up, closing, or switching of the application on the terminal, or restoration from screen lock.

\* \* \* \* \*